United States Patent [19]

Mingenbach

[11] Patent Number: 4,724,181
[45] Date of Patent: Feb. 9, 1988

[54] MEMBRANE STABILIZER

[76] Inventor: William A. Mingenbach, P.O. Box 49, Taos, N. Mex. 87571

[21] Appl. No.: 866,769

[22] Filed: May 22, 1986

[51] Int. Cl.[4] .............................................. D06C 3/08
[52] U.S. Cl. ...................................... 428/174; 52/222; 160/379; 160/378
[58] Field of Search ............... 47/17; 52/222, 63, 474, 52/573, 767, 769; 135/104, 105; 428/174; 160/378, 379; 254/199; 28/184

[56] References Cited

U.S. PATENT DOCUMENTS

| | | | |
|---|---|---|---|
| 3,950,869 | 4/1976 | Samarin | 160/378 |
| 3,982,361 | 9/1976 | Deutch | 52/222 |
| 4,144,660 | 3/1979 | Lamb | 160/378 |
| 4,179,830 | 12/1979 | Lamb | 160/378 |
| 4,409,749 | 10/1983 | Hamu | 160/378 |
| 4,430,814 | 2/1984 | Wulc | 160/378 |
| 4,431,229 | 2/1984 | Unger | 160/378 |

Primary Examiner—John E. Kittle
Assistant Examiner—Donald J. Loney

[57] ABSTRACT

A device is provided for stabilizing a flexible membrane secured within a frame, wherein a plurality of elongated arms are disposed radially from a central hub which penetrates the membrane, said arms imposing alternately against opposite sides of the membrane, thus warping and tensioning the membrane into a condition of improved stability. The membrane may be an opaque or translucent sheet or other material.

12 Claims, 10 Drawing Figures

MEMBRANE STABILIZER

The U.S. Gov't. has rights in this invention pursuant to contract DE-FC02-80cS30521 between Dow-Corning Corporation and the U.S. Department of Energy.

BACKGROUND OF THE INVENTION

In recent years, a variety of flexible plastic membranes have been developed and marketed as alternatives to glass for many glazing applications such as greenhouses, windows, skylights, and as covers for solar-energy collection systems. These membranes can have high transmissivity to light, are more resistant to breakage, and are lighter and often less costly than glass. However, when such membranes are used exposed to the exterior of buildings, their characteristic lack of plate strength and low modulus of elasticity have imposed difficulties in stabilizing them in order to inhibit random wrinkling and sag, to limit stress from snow and other environmental loads, and to prevent flutter from wind action, all of which can adversely affect their market acceptability and service life.

In typical applications of smaller scale where governing design considerations require the installation of a glazing membrane within a flat planar quadrilateral glazing frame, the membrane is usually held taut by an edge-framing system which maintains the membrane in planar tension between one or both pairs of opposing frame members. To operate satisfactorily over a long-term service life, the frame must continuously adjust to sustain membrane tension during differential dimensional changes in both itself and the membrane caused by variations in temperature and moisture, as well as during permanent creep and enlargement of the membrane caused by the tensioning stress. Due to difficulties in meeting this requirement, many systems for tensioning membranes in planar frames are diminished in usefulness by complexity of detail, high cost of manufacture, difficulty in on-site assembly or repair, or by inability to provide the desired uniform tension over long service.

As an alternate to planar tensioning, membranes may be held and tensioned within edge framing assemblies which are non-planar and thereby warp the membrane into various types of opposing compound curvatures. Examples of warped surfaces with such curvatures may be found on saddles, hyperbolic parabaloids, and in the configurations of many contemporary tent designs.

For a given uniform load normal to the membrane, warped membranes tend to react to the loading with lower internal stress, and therefore lower deflection, than do planar membranes of equivalent material and area. Because resistance to deflection under load is often the most significant criteria of stability, warped membranes will require less tension and therefore will impose lower bending stress on the frame, for a given degree of stability, than will planar membranes which are otherwise equivalent. Therefore, techniques which provide membrane stabilization by means of such warped, non-planar, tent-like configurations have proven highly superior to techniques for stabilization which employ planar configurations, and thus warped membranes have been repeatedly chosen and successfully used to cover or enclose expansive portions of numerous large buildings.

However, despite the superior stabilizing ability of the warped configurations, in applications of reduced scale where smaller membrane areas of less than approximately 200 square feet are held within a single peripheral framing system, the use of warped surfaces has been inhibited, partly due to a commonly held presumption that a non-planar peripheral frame or other non-planar supporting structure is necessary to achieve the desired warp. Due to its atypical corner joinery, such a frame is often difficult and costly to achieve in a manner compatible with the rectilinear subassemblies which are common in ordinary low-cost construction.

From the preceding brief analysis, it becomes evident that the use of exterior membrane glazing in small areas has been limited in part by an apparent incompatibility between the higher stability available from warped membrane surfaces and the convenience of planar edge-framing conditions.

STATEMENT OF THE INVENTION

A principal object of the invention is to overcome the described problems by providing a convenient means of achieving a doubly-curved, tensioned, and thereby stabilized membrane within a peripheral supporting frame which may be planar.

Another object of this invention is to provide a convenient means for adjusting the membrane tension at the time of initial installation and thereafter as may be necessary to properly stabilize the membrane in order to achieve satisfactory performance under typical environmental conditions which are specific to the site of the application such as wind pressures, snow loads, impact and other loads in service which could deflect the membrane beyond acceptable limits.

Another object of this invention is to provide a means for maintaining the stability of the membrane by holding tension substantially constant during the dimensional changes in membrane and frame which are induced by cyclic fluxuations in temperature and humidity.

Still another secondary object is to provide a device for stabilizing the membrane which device operates independently of the frame members which grip and support the membrane, and which device therefore does not require any specifically designated framing system or solely appropriate type of frame members for its function.

Additional objects and advantages of the invention are set forth in part in the following descriptions, or will be obvious from those descriptions or from the appended claims.

To achieve the foregoing objects, a flexible membrane to be stabilized by the membrane stabilizer of this invention is first suitably secured in continuous fashion to the edges of a surrounding frame which may be planar. The membrane must be flat and wrinkle-free but need not be tensioned at the time of connection to the frame. The membrane is then perforated at a suitably located point to permit the affixing of said stabilizer to the membrane. Two sets of properly configured, elongated, bow-shaped arms of the device are then positioned against the membrane, one said set being on each side of the membrane, each set consisting of two or more arms which emanate from a common hub. The hubs of both sets are then affixed to each other by means of a member which passes through the said membrane penetration and the two sets of arms are then pulled toward each other and into firm contact with the membrane by means of a suitable adjustment at the hub attachment. As the arms impose against the membrane by the action of said adjustment, the membrane is configured into excursions in alternating directions from its initial planar condition which configuring serves to cooperatively warp and tension and thereby stabilize the membrane. The device may be variously biased so as to maintain pressure of the arms against the membrane, thus maintaining approximately constant tension in the membrane during periods of environmental loading and during dimensional changes in the membrane caused by changes in temperature, moisture, and by long-term creep. Means of adjustment may be incorporated in the device so as to make changes in membrane tension as necessary to suit the specific characteristics of the application. One or more membrane stabilizers may be affixed to a membrane within a single frame.

DESCRIPTION OF ILLUSTRATED EMBODIMENT

Figure 1:
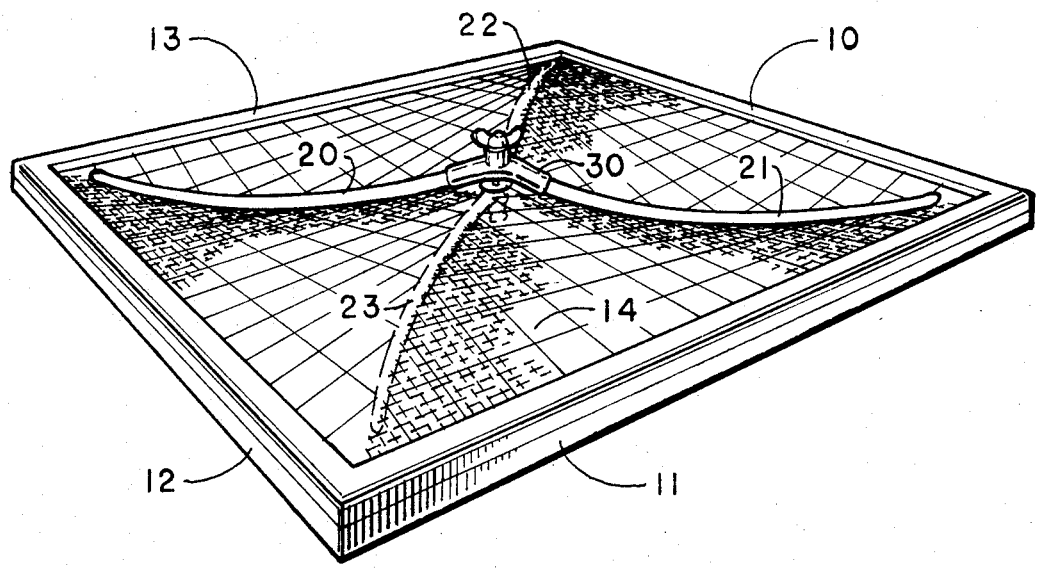
FIG. 1 is an overall perspective view of a preferred embodiment of the present invention.
Figure 2:
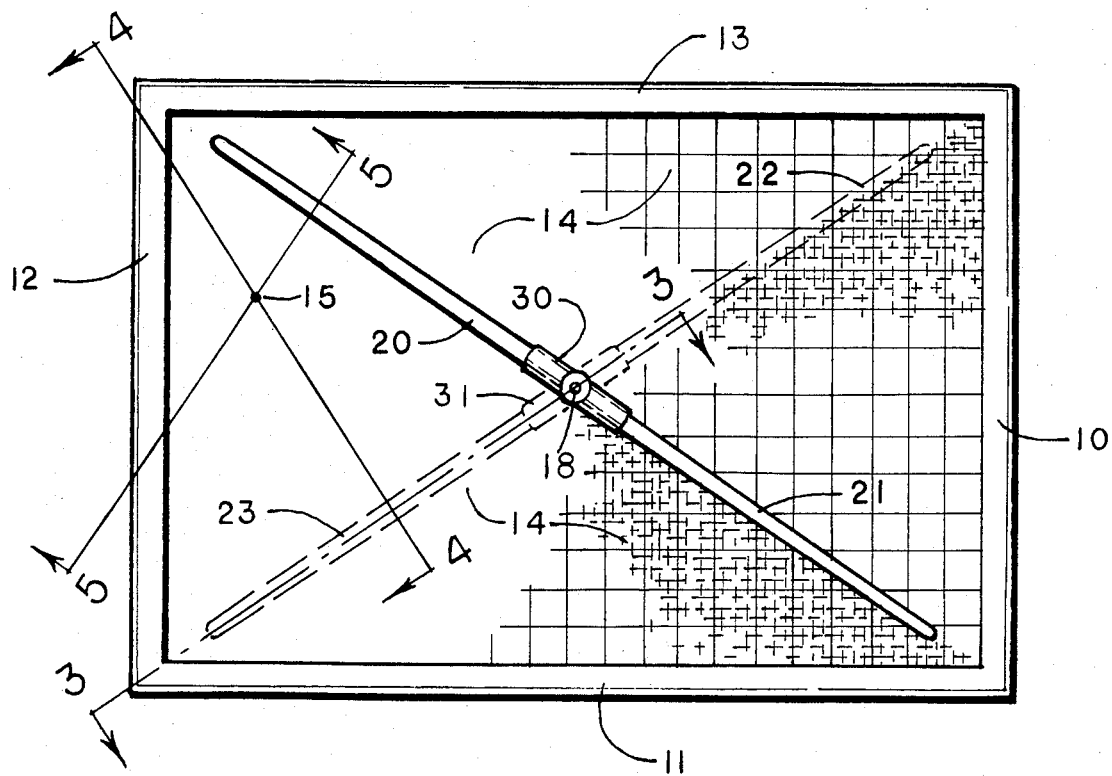
FIG. 2 is a plan veiw of the assembly presented in FIG. 1.

Referring to FIGS. 1 and 2, the membrane stabilizer assembly is mounted on a flexible membrane 14 which has been secured to a peripheral supporting frame 10 through 13. Although for the sake of clarity in this illustration the supporting frame is shown as an isolated entity, the said frame may also be incorporated within a building or other larger supporting assembly prior to the installation of the stabilizer.

Although it will be obvious to those skilled in the art that the membrane stabilizer of this invention will function as described in this specification when installed on membranes which are secured to peripheral supporting frames which are non-planar or which have non-rectilinear configurations, in the illustrated embodiment the peripheral frame 10 through 13 is rectangular in plan, with the lines of emergence of the membrane from the four edge-members of said frame lying in a common plane. The particular construction of the frame forms no part of this invention and may be carried out in accord with generally accepted principles of design well known in the prior art.

The membrane 14 is a flexible polymeric sheet either unreinforced, or reinforced with glass or polyester fiber or other type of synthetic or natural fiber. While in the illustrated embodiment the optical characteristic of the membrane is hereby specified as translucent to visible light, in other embodiments the optical characteristics of the membrane may be translucent, transparent, or opaque, as required to suit the application. In lieu of said flexible polymeric sheet, the membrane may be of canvas or of any flexible plastic or metallic screen without infill, such as common insect screening.

Figure 6:
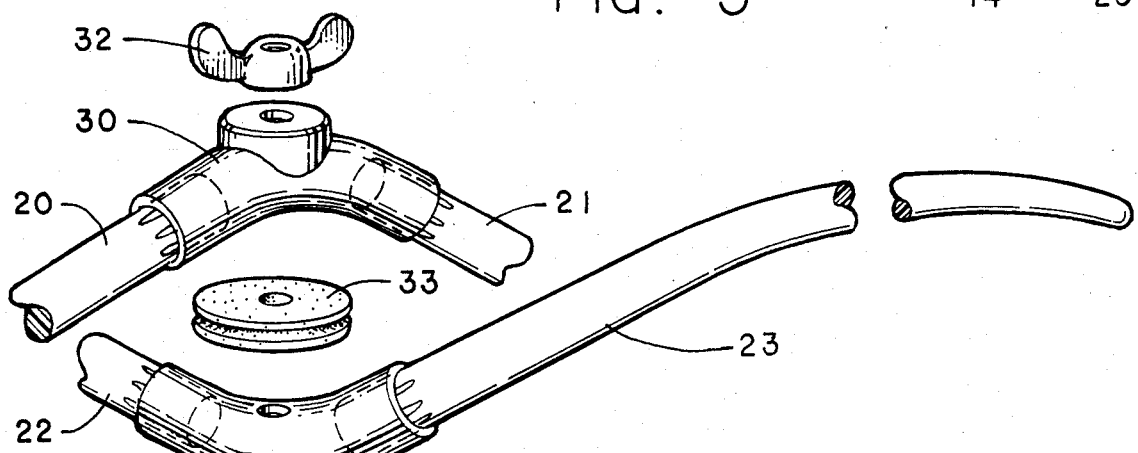
FIG. 6 is an exploded perspective view of the separate parts of the arm attachment assembly which also maintains bow-pressure against opposite faces of the membrane to be stabilized.

In FIG. 1, the membrane 14 is symbolically indicated by a rectilinear grid, occassionally broken away, for the purpose of clarity in graphically representing the characteristic warp which is induced in said membrane by the attachment of the stabilizer. In FIG. 2, the said grid is partially shown in plan view so as to demonstrate the said rectilinearity of the grid when viewed normal to the plane of the frame. Prior to the attachment of the membrane stabilizer of this invention, the membrane 14 to be stabilized is flattened and secured in a uniform manner to the edges of the frame 10 through 12. Said membrane need not be tensioned or stressed at the time of its being secured to the peripheral frame, it being sufficient, subject to exceptions hereinafter described, that the membrane be flat and free of wrinkles, random bulges and folds along the lines of attachment to said peripheral frame, and a typical sag in the membrane in the range of 1/40 to 1/60 of the least dimension of the frame is acceptable. Subsequent to being installed in the frame, the membrane is penetrated at a specified point 18 and a grommet 33 in FIG. 6 is affixed said grommet serving to reinforce the membrane and to inhibit infiltration of air and water through said penetration. The purpose of said penetration in the membrane is to establish the location of a hub which extends through said membrane and which attaches, positions, and holds two sets of elongated arms, 20, 21, and 22, 23, one said set of arms being on each side of the membrane, so as to impose said sets of arms with opposite forces against the membrane, said hub illustrated in FIG. 6 and consisting of couplings 30 and 31, bolt 35, nut 32, and bias spring 34.

Figure 3:
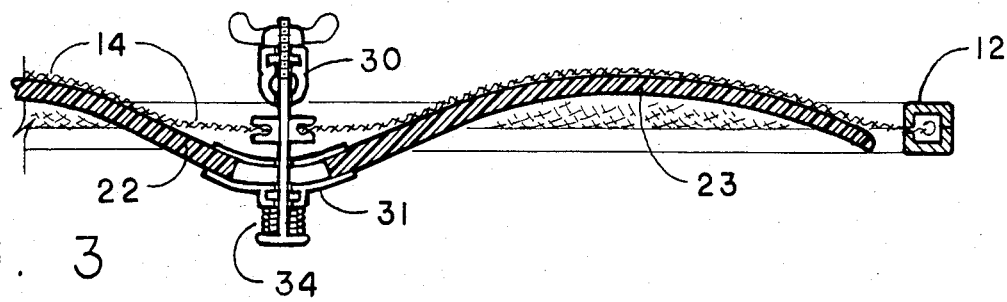
FIG. 3 is a fragmentary cross-sectional view taken essentially on the line 3—3 of FIG. 2.

To prepare the stabilizer for installation on the membrane, two similar sets of elongated arms are assembled as illustrated in FIG. 6. One set of arms, 20 and 21, is secured to sockets in coupling 30, which coupling is a component of said hub. Another similar set of arms, 22 and 23, is similarly secured to coupling 31, which coupling is also a component of said hub. The approximate positional relationship of said sets of arms to said couplings is illustrated in FIG. 3, where arms 22 and 23 are shown engaging the sockets of coupling 31, all in sectional view as designated in FIG. 2, Section 3—3.

In the illustrated embodiment, all arms in both sets are made of materials of sufficiently high modulus of elasticity and with adequate section modulus so as to operate in a substantially rigid manner, maintaining curvature and position as illustrated while being imposed upon the membrane as required for the function of the stabilizer. Typical materials suitable for this embodiment are drawn or cast aluminum alloy, formed metallic tubing or rod, or fiber-reinforced plastic bar or rod.

To install the stabilizer on the membrane, referring again to FIG. 6, bias spring 34 is installed against the head of threaded bolt 35, bolt 35 is then inserted through the transverse hole in coupling 31, and the bolt 35, thus carrying the set of arms 22 and 23, is then inserted through grommet 33 previously installed in membrane 14. Bolt 35 is held in place against coupling 31, and coupling 30 is then installed on the extention of bolt 35 protruding through grommet 33, said extention being on the opposite side of membrane 14 from coupling 31, and nut 32 is loosely applied to the threaded end of bolt 35.

The two sets of arms, now loosely secured, one said set being on each side of the membrane 14, are rotated in respect to the axis of bolt 35 in said hub as necessary to align each set of arms in a crossing relationship to the other, and specifically in this illustrated embodiment, congruent with the diagonals of the frame 10 through 13. Nut 32 is then further tightened as required, thus imposing equal and opposite forces to couplings 30 and 31 through bolt 35 and bias spring 34, said couplings in turn exerting said equal and opposite forces on the sets of arms 20 and 21 and 22 and 23 and thus against the opposing faces of the membrane 14. The approximate imposition of a typical set of arms 22 and 23 against the membrane 14 is illustrated in FIG. 3. The exact arcuate shape of each arm and the degree of excursion of the membrane from the plane of frame 12 necessary for satisfactory stabilization being dependent on the modulus of elasticity of the membrane.

Figure 4:
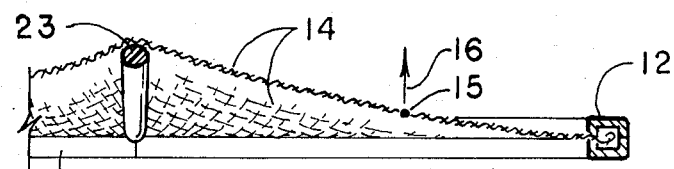
FIG. 4 is a fragmentary cross-sectional view taken essentially on the line 4—4 of FIG. 2.
Figure 5:
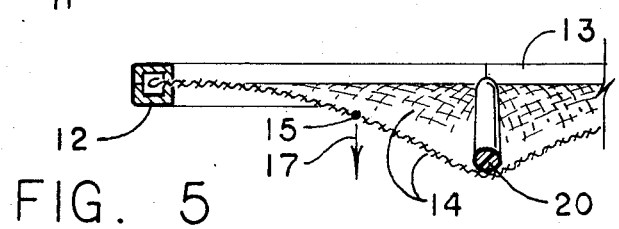
FIG. 5 is a fragmentary cross-sectional view taken essentially on the line 5—5 of FIG. 2.

The stabilizing action induced by the forces of the stabilizer acting against the membrane is illustrated in FIGS. 4 and 5 which are Section 4—4 and 5—5, respectively, on the plan view of FIG. 2. Point 15 in said figures may be any point on the membrane lying within a sector between any two radially adjacent arms of the stabilizer which are on opposite sides of the membrane. In FIG. 4 membrane 14 is drawn upward from the plane of frame members 11 and 12 by the action of arm 23, thus in this section looking outward along arm 23, membrane 14 is seen to curve, the set of lines on membrane 14 with a similar curve and passing through point 15 producing an integrated force 16 acting upward on point 15 with specific magnitude which is dependent on the amount of warp and tension in membrane 14. In FIG. 5, looking outward along arm 20, membrane 14 is now seen in an opposite curvature to that of FIG. 4, being drawn downward from the plane of frame members 12 and 13 by the action of arm 20. Due to said opposite curvature point 15 is now subject to the opposite force 17 acting downward and with a magnitude similarly dependent on the amount of warp and tension in membrane 14. The above described condition applies to any point on the membrane which is displaced by the action of the stabilizer. Thus the membrane is placed in opposing curvatures by the action of the stabilizer, and membrane displacements induced by imposed loading are resisted by increased tension along the set of lines on the membrane which lines are concave when facing the incoming force of said imposed loading.

From the foregoing, and to those skilled in the art of this invention, it will be obvious that one measure of the degree of membrane-stabilization achieved by the action of the stabilizer is the extent to which the arms of the stabilizer impose into the membrane while warping the membrane into doubly-curved surfaces. A convenient measure of said degree is the ratio of the distance of the maximum membrane excursion from the position of the membrane prior to application of the stabilizer to the least distance between frame members measured through the centroid of the membrane, higher ratios resulting in higher stability, and visa versa. The degree of stabilization provided by this invention will increase over time, provided that bias is maintained and if the membrane is of a material of low modulus of elasticity, such as polyetheline, which yields and permanently deforms as a result of long-term pressure of the stabilizer-arms. However, in the instance of a membrane with a high modulus of elasticity, such as wire screen or certain plastics such as mylar, said deformation and resultant increase in stabilization may not occur, and when, due to said high modulus of elasticity, the said ratio of initial imposition of the stabilizer arms is not sufficient to provide the desired degree of stability, then prior to the application of the membrane stabilizer on the membrane the action of said stabilizer may be enhanced by selectively prestretching portions of the membrane beyond the yield point so as to produce discreet and localized permanent deformations in the membrane along and adjacent to those lines which are to be the lines of contact between the stabilizer arms and the membrane. The particular method employed for said pre-stretching of the membrane forms no part of this invention and may be carried out in accord with generally-accepted principles well known in the prior art.

The ability of the stabilizer to maintain a membrane in a condition of continuous stability during the dimensional changes in frame and membrane caused by fluxuations in temperature, humidity, and environmental loading, is dependent upon the adequacy of biasing so as to sustain pressure between the sets of arms and the membrane during said fluxuations, and said biasing may be obtained by any one or a combination of the following techniques:

a. As illustrated in FIGS. 3 and 6, a compression spring 34 may be introduced in the hub assembly. Alternately, or acting in combination with said spring, bolt 35 may operate in series with a tension spring which maintains bias against the elements of the hub which engage the arms.

b. The membrane itself may be used alone to maintain bias in instances where the material of the membrane has sufficient inherent elasticity to provide the necessary bias over satisfactory periods of service, or where frequent adjustments of the hub can be made as necessary to maintain membrane tension.

c. Although in the illustrated embodiment the stabilizer arms are designated as substantially rigid elements, the said arms may alternately provide bais wherein the material of their construction provides flexibility in said arms, examples of said material being glass-fiber in a polymeric matrix, carbon fiber, spring steel, wood, or other material; the flexibility of said arms being such that, as the membrane accepts the imposition of said arms, the arms are drawn into bows of a curvature which complies with and follows the characteristic warp of the membrane along the curves of imposition between said membrane and said arms. Because of said compliance with the warp of the membrane, said flexible arms may be fabricated and incorporated in said stabilizer as uncurved linear bars or rods.

Although in the illustrated embodiment a single stabilizer is symmetrically applied to a membrane within a rectangular planar frame, it will be obvious to those skilled in the art that a large number of alternate embodiments are possible. For example, membranes within non-rectangular frames may also be stabilized by the device of this invention; more than one stabilizer may be cooperatively employed to stabilize a membrane held within a single frame entity; and the arms which assemble into the said two sets of arms may be of non-uniform length within any given stabilizer-assembly. Referring to the plan views in FIGS. 7 through 10 of the drawings, a few alternate embodiments of this invention are illustrated.

Figure 7:
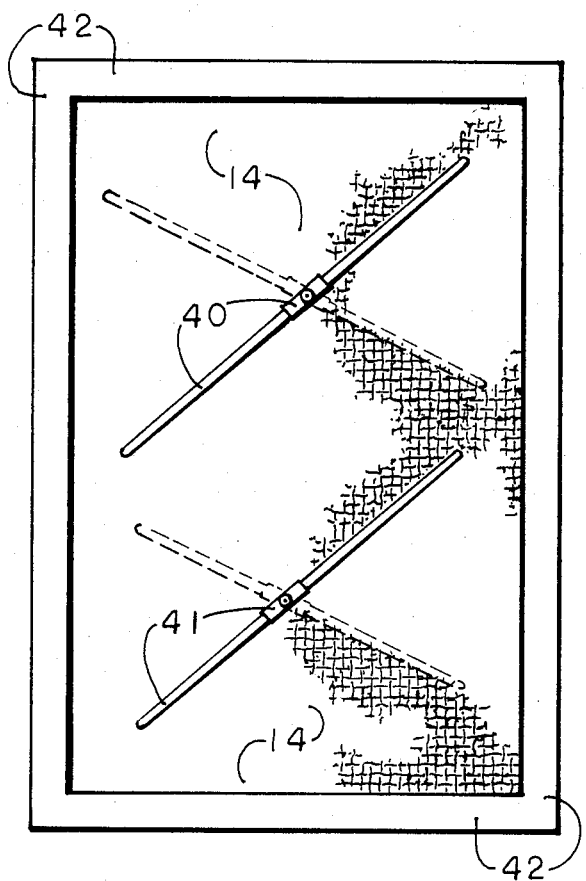
FIG. 7 is a plan view of an alternate embodiment employing multiple tensioners of differing size and unequal arm lengths.

FIG. 7 illustrates the complimentary use of two membrane stabilizers 40, 41 on a single membrane 14 each applied with their centers slightly offset within a rectangular frame 42, each said stabilizer having different weight and arcuate arms of differing lengths, said departures from uniformity and symmetry being employed for the purpose of dampening low-frequency resonance in the entire assembly of stabilizers and membrane.

Figure 8:
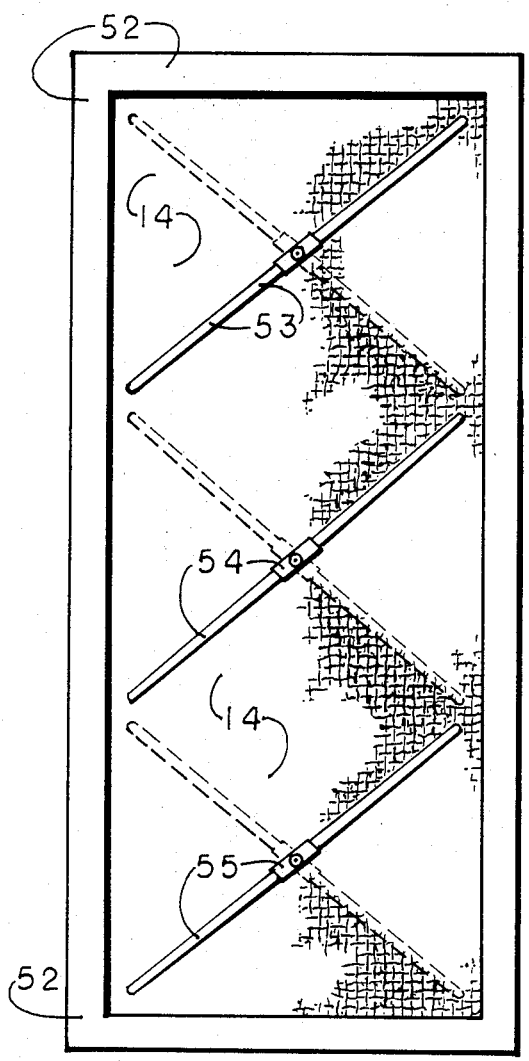
FIG. 8 is a plan view of an alternate embodiment employing multiple tensioners.

FIG. 8 illustrates the use of a plurality of stabilizers 53, 54, 55 uniformly disposed on a membrane 14 within a frame 52 of high aspect ratio, thus permitting shorter and lighter arm constructions on the stabilizers than would be required if a single larger stabilizer were employed to provide a similar degree of stabilization.

Figure 9:
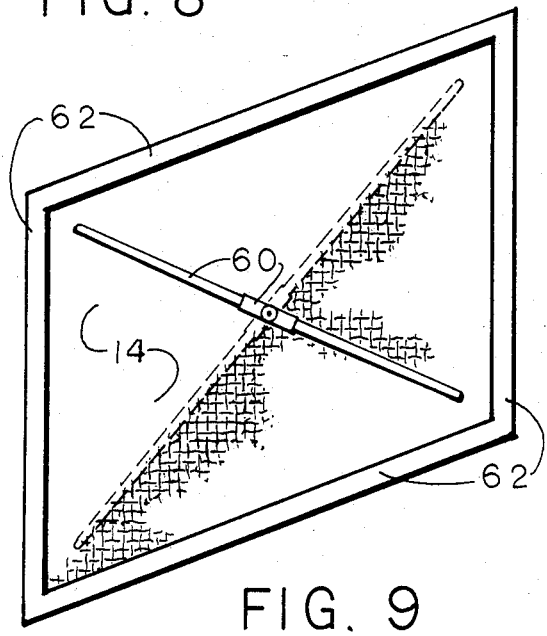
FIG. 9 is a plan view of an alternate embodiment employing a non-rectangular frame.

FIG. 9 illustrates the use of a single stabilizer 60 of unequal bow-lengths, applied to a membrane secured within a non-rectangular frame 62 which in this instance is a parallelogram.

Figure 10:
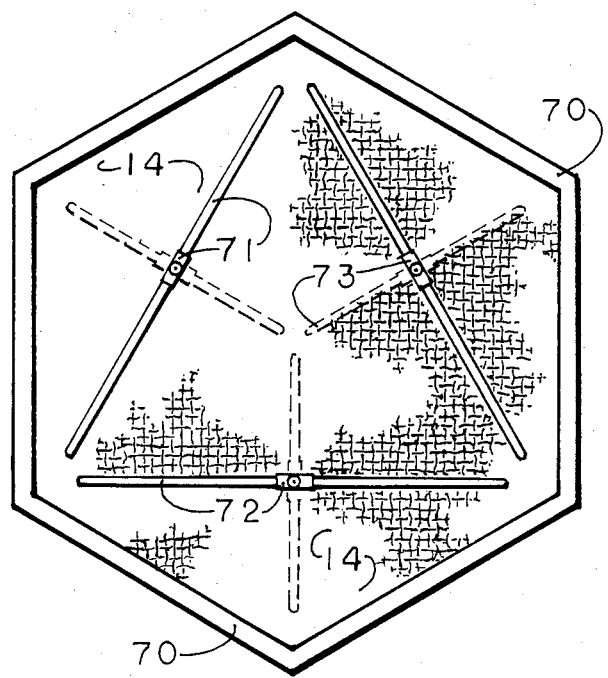
FIG. 10 is a plan view of an alternate embodiment employing multiple tensioners in a hexagonal frame.

FIG. 10 illustrates the use of three similar stabilizers 71, 72, 73 applied in symmetrical fashion to a membrane 14 secured within an hexagonal frame 70, each said stabilizer having unequal bow-lengths.

Although in all of the above illustrations the membrane stabilizer of this invention has consisted of two arms in each set of arms, with both arms in each set extending in opposite directions from a central hub, it will be obvious to those skilled in the art that the said stabilizer may incorporate a plurality of arms in each set, said arms extending in a plurality of directions from said central hub, provided that among the arms in each set there are at least two arms which are radially separated from each other by at least one arm imposing from the set on the side opposite. Thus, the size, number, and radial pattern of arms in both sets of a given stabilizer need not be the same, and the radial separations of the arms may be varied as required to serve the application.

One example of such an application is the case of a membrane supported by an hexagonal frame, where, in the interest of a uniform appearance, a single stabilizer could be mounted with the central hub being at the approximate geometric center of the membrane, and said hub holding three arms in each set, each arm in each set displaced approximately 120 degrees from the other arms, and each set of arms radially displaced by approximately 60 degrees from the set of arms imposing on the side opposite.

A similar arrangement of arms could be used in the instance of a membrane within a triangular frame, where the central hub could be designed to hold one set of three arms each arm extending along a line toward a different vertice of the frame, and each of the three arms in the set on the side opposite could be oriented along a different line normal to one of the three sides of the frame.

Still another example would be the instance of a membrane to be stabilized by the device of this invention which membrane is mounted within a pentagonal frame where, for the sake of uniform appearance, the stabilizer could be mounted with the hub at the approximate center of the membrane, and said hub configured to hold all arms in both sets extending along lines normal to the five frame edges. Thus one set of arms would consist of only two arms radially separated by approximate angles of 144 and 216 degrees, with the set on the side opposite having three arms radially separated by 72, 144, and 144 degrees, the arms radially separated by said 72 degrees having no arm between them imposing from the side opposite, and the arms separated by said 216 degrees having two adjacent arms between them imposing from the side opposite.

While numerous other variations in the use of the membrane stabilizer will be obvious, it is important to note that in such variations the stabilizer need be applied only in contact with the membrane, and said stabilizer functions fully in accord with this invention without requirement for touching, or connecting to, the peripheral supporting frame. However, in the instance of applications where severe loadings are anticipated or where extreme dampening is necessary, the action of the stabilizer may be enhanced by configuring and locating the stabilizer on said membrane so as to allow the distal end of the arms in one set to intersect and bear upon the peripheral frame. In the instance of this alternate embodiment, clips or notches may be employed at said points of bearing between arms and frame.

While illustrated and alternate embodiments of this invention have been presented hereinabove, further modifications, variations and adaptations occur to those skilled in the art, and it is to be expressly understood that such further modifications, variations, and adaptations are within the scope and spirit of this invention, as set forth in the following claims:

I claim:

1. In a flexible polymeric membrane uniformly disposed within and secured to a supporting planar frame along the peripheral edge portions of said membrane, the improvement wherein a membrane stabilizer cooperatively warps, tensions, and thereby stabilizes said flexible membrane, said warping and tensioning being provided by:

the continuous action of two sets of stressed elongated arms, each set imposing against a face of the membrane which face is opposite to the face imposed upon by the other set;

all arms in both sets configured so as to have at least one surface of convex curvature extending along the length of said arms, and all said arms emanating radially and cantilevered from a hub which extends through a penetration in the membrane and which hub attaches, positions, and holds all arms in each said set so as to impose said surface of convex curvature of all said arms against the membrane;

the number of arms in each said set being two, both arms in each set extending in opposite directions from said hub, each said set being positioned against the membrane in a crossing relationship to the set on the side opposite; and said hub consisting of two couplings each of which engage and hold said sets of arms against the membrane, one coupling being on each side of the membrane, said couplings being secured to each other by a biased adjustable tension member which penetrates the membrane and which enables the installation and the cooperative adjustment of the imposition of both sets of arms against the membrane.

2. In a flexible polymeric membrane uniformly disposed within and secured to a supporting frame along peripheral edge portions of said membrane, the improvement wherein a membrane stabilizer cooperatively warps, tensions, and thereby stabilizes said flexible membrane, said warping and tensioning being provided by:

the continuous action of two sets of stressed elongated arms, each set imposing against a face of the membrane which face is opposite to the face which is imposed upon by the other set;

all arms in both sets emanating radially and cantilevered from a hub which extends through a penetration in the membrane and which hub attaches, positions, and holds all arms in each said set relative to the others and imposing against the membrane; and each said set having a plurality of arms, said arms disposed to impose against the membrane with radial separations as required for the application, provided that among the arms in each set there are at least two arms which are readially separated from each other by at least one arm imposing from the set on the side opposite.

3. In a membrane stabilizer as set forth in claims 1 and 2 the further improvement wherein said arms have flexibility so as to form a bow which complies with the shape of the membrane as said membrane accepts the imposition of the arms of said stabilizer, said flexibility also being a biasing means whereby the said stabilizer maintains an approximately constant tension in the membrane to compensate for dimensional changes in the said frame and membrane.

4. In a membrane stabilizer as set forth in claim 3 the further improvement wherein the imposition of said sets of arms against the membrane may be varied by means of adjustment of the extension through the membrane of said hub.

5. In a membrane stabilizer as set forth in claim 3 the further improvement wherein the function of said stabilizer is enhanced by the dampening action induced by contact between the distal end of one or more said arms and a portion of said supporting frame.

6. In a membrane stabilizer as set forth in claim 3 the further improvement wherein the positional location of said stabilizer on said membrane is further secured by a coating of elastic material on those portions of each set of arms which impose upon the membrane.

7. In a membrane stabilizer as set forth in claim 3 the further improvement wherein the positional location of said stabilizer on said membrane is further secured by a flexible adhesive bonding material applied to one or more arms so as to adhere said arms to said membrane.

8. In a membrane stabilzier as set forth in claim 3 the further improvement wherein one or more said arms are curved within a plane which is parallel to the plane of said supporting frame.

9. In a membrane stabilizer as set forth in claim 3 the further improvement wherein the said membrane is a woven material or is a screen of fiber or wire, or is reinforced by said type of screen or by woven material.

10. In a membrane stabilizer as set forth in claim 3 the further improvement wherein the said membrane is transparent, translucent, or opaque.

11. In a membrane stabilizer as set forth in claim 3 the further improvement wherein the membrane is with indentations along the lines of contact of said arms to improve the ability of said membrane to accept the impositions of the arms of said stabilizer.

12. In a membrane stabilizer as set forth in claim 3 the further improvement wherein a plurality of said stabilizers are applied to said membrane within said supporting frame.

* * * * *